United States Patent
Deshpande et al.

(10) Patent No.: US 7,260,614 B2
(45) Date of Patent: Aug. 21, 2007

(54) METHODS AND SYSTEMS FOR SCALABLE STREAMING OF IMAGES WITH CLIENT-SIDE CONTROL

(75) Inventors: Sachin G. Deshpande, Vancouver, WA (US); Renjit Tom Thomas, Vancouver, WA (US)

(73) Assignee: Sharp Laboratories of America, Camas, WA (US)

( * ) Notice: Subject to any disclaimer, the term of this patent is extended or adjusted under 35 U.S.C. 154(b) by 988 days.

(21) Appl. No.: 09/897,383

(22) Filed: Jul. 2, 2001

(65) Prior Publication Data

US 2002/0087728 A1    Jul. 4, 2002

Related U.S. Application Data

(63) Continuation-in-part of application No. 09/709,985, filed on Nov. 10, 2000, now Pat. No. 7,206,804.

(51) Int. Cl.
 *G06F 15/16* (2006.01)
(52) U.S. Cl. .............. 709/217; 709/218; 709/219; 709/226; 345/641
(58) Field of Classification Search ........... 709/232, 709/224, 217–219, 226; 345/765, 641, 760
See application file for complete search history.

(56) References Cited

U.S. PATENT DOCUMENTS

| | | | |
|---|---|---|---|
| 5,682,441 A * | 10/1997 | Ligtenberg et al. ......... 382/232 |
| 5,742,768 A * | 4/1998 | Gennaro et al. | |
| 5,764,235 A | 6/1998 | Hunt et al. ................ 345/428 |
| 5,930,474 A | 7/1999 | Dunworth et al. ..... 395/200.47 |
| 6,003,046 A | 12/1999 | Nielsen ..................... 707/513 |
| 6,009,410 A * | 12/1999 | LeMole et al. ............... 705/14 |
| 6,067,571 A | 5/2000 | Igarashi et al. ............ 709/232 |
| 6,356,283 B1 * | 3/2002 | Guedalia .................... 345/760 |
| 6,414,693 B1 * | 7/2002 | Berger et al. ............... 345/641 |
| 6,510,459 B2 * | 1/2003 | Cronin et al. .............. 709/219 |
| 6,539,354 B1 * | 3/2003 | Sutton et al. .............. 704/260 |
| 6,657,647 B1 * | 12/2003 | Bright ........................ 715/856 |
| 6,791,571 B1 * | 9/2004 | Lamb ......................... 345/619 |
| 6,834,306 B1 * | 12/2004 | Tsimelzon ................. 709/228 |
| 2002/0025085 A1 * | 2/2002 | Gustafson et al. ......... 382/311 |
| 2002/0107672 A1 * | 8/2002 | Povich ......................... 703/1 |

OTHER PUBLICATIONS

Article Entitled "Hyper-text Transfer Protocol-HTTP 1.1" RCF2616, Networking Group, by, Fielding, Gettys, Mogul, Frystyk, Masinter, Leach and Berners-Lee, Jun. 1999.pp. 1-114.
Article Entitled "JPEG2000 Verification Model 7.0 (Technical description)", ISO/IEC JTC 1/SC 29/WG 1 WG1N1684, Verification Model ad-hoc group. Apr. 2000.pp. 1-178.

(Continued)

*Primary Examiner*—Saleh Najjar
*Assistant Examiner*—Liang-che Alex Wang
(74) *Attorney, Agent, or Firm*—Krieger Intellectual Property, Inc.; Scott C. Krieger

(57) ABSTRACT

Embodiments of the present invention provide systems and methods for managing and transmitting image data. Some embodiments are particularly suited to streaming JPEG 2000 images from a web server.

7 Claims, 2 Drawing Sheets

OTHER PUBLICATIONS

Article Entitled "JPEG 2000 Part I Final Committee Draft Version 1.0", ISO/IEC JTC1/SC 29/WG1 N1646,JPEG2000 Editor Martin Boliek, Co-editors Charilaos Christopoulos, and Eric Majani,Mar. 2000.pp. 1-190.

Website, Real Networks website http://www.realnetworks.com/ Jun. 28, 2001.

Website, Microsoft Website: www.microsoft.com/windows/windowsmedia/EN/default.asp Jun. 28, 2001.

Website, Adobe acrobat website: http://www.adobe.com/products/acrobat/ Jun. 28, 2001.

Article Entitled A virtual file media access mechanism and its application in JPEG2000 images for browsing over internet, By, J.Li, H.Sun, H.Li, Q. Zhang, X. Lin ISO/IEC JTC1/SC29/WG1 N1473, Nov. 1999. pp. 1-13.

* cited by examiner

JPEG 2000 Codestream Structure

Thumbnail View

METHODS AND SYSTEMS FOR SCALABLE STREAMING OF IMAGES WITH CLIENT-SIDE CONTROL

RELATED REFERENCES

This application is a continuation-in-part of application Ser. No. 09/709,985, filed Nov. 10, 2000, now U.S. Pat. No. 7,206,804, entitled "Methods and Systems for Transmitting Digital Images," issued on Apr. 17, 2007, by Deshpande et al.

THE FIELD OF THE INVENTION

Embodiments of the present invention relate to methods and systems for managing and transmitting image data. Some embodiments are particularly suited to streaming JPEG 2000 images from a web server.

BACKGROUND

In many Internet and network applications, large image files are frequently transferred. These large image files must be transmitted from server to client with accuracy and speed. When connection speeds are not optimal, these images can take an inconveniently long time to download to a client. Using known methods, this extended lag results in high latency or delay before display of the complete image.

Image files can also be problematic when their size, resolution or other attributes are not optimized to the needs of the user.

JPEG 2000 is an image compression standard with the ability to support large images. JPEG 2000 also supports resolution, quality and region-of-interest scalability. Thus, the JPEG 2000 bitstream is scalable. However the server-client protocol to get only part of the JPEG 2000 bitstream is not defined. Details of the JPEG 2000 standard may be accessed by reference to JPEG 2000 Part 1 Final Committee Draft Version 1.0, ISO/IEC JTC 1/SC 29/WG 1 N1646, March 2000 and JPEG 2000 Verification Model 7.0 (Technical Description), ISO/IEC JTC 1/SC 29/WG 1 WG1N1684, April 2000, both of which are incorporated herein by reference.

In JPEG 2000, an image consists of components. An image may be spatially divided into tiles and tile-components, where each tile is independently coded. A tile-component is then divided into resolutions and sub-bands. A resolution can be partitioned into precincts using rectangular grids. A sub-band is divided into code-blocks where each code-block is an independent coding unit. A precinct may consist of a rectangular region of code-blocks in all sub-bands of the same resolution. The coded data of each code-block can be distributed across one or more quality layers in the codestream. The data representing a specific tile, layer, component, resolution and precinct appears in the codestream in a contiguous segment called a packet.

There are two types of headers in the codestream as shown in FIG. 1. The main header 2 is at the beginning of the codestream. The tile-part headers 4 are found at the beginning of each tile-part 6, where a tile-part is a portion of the codestream that makes up some or all of a tile. The main header 2 provides information about the uncompressed image such as width, height, width of a tile, height of a tile, number of components, bit-depth of each component, etc. The main header 2 also provides the coding style default (COD) (e.g., decomposition levels, progression order, number of layers, code-block size, wavelet filter used, packet partition size, etc.), the quantization default (QCD), as well as some optional information such as region of interest, packed packet headers (PPM), a list of packet lengths (PLM), the length of every tile-part in the codestream (TLM), etc. The main header 2 is followed by one or more tile-parts 6 (each tile-part includes a tile-part header 4 and the tile-part data 8). Similar information can be included in the tile-part header 4 to override the default in the main header 2. The tile-part data 8 consists of packets 10, 12.

The lengths of the main header 2 and each tile-part header 4, and the length of each tile-part 6, can all be easily derived from the main header 2 or tile-part headers 4. In addition, the length of each packet 10, 12 can be obtained from the main header 2 or derived from the packet headers located in the main header 2 or in the codestream 14. Based on this information and the length of code-block contribution information included in each packet header, we can identify the locations/segments of the codestream for a particular code-block, precinct, resolution, component and layer. In fact, an index file can be generated to record this indexing information by parsing the codestream headers, including the main header 2, tile-part headers 4 and packet headers 14. This index file can then be used to facilitate the retrieval of a particular portion of the codestream.

For a given tile, the order in which the packets are interleaved is called the progression order. The interleaving of the packets can progress along four axes: layer, component, resolution and precinct. There are five allowable progression orders in the standard which are signaled by the COD and/or Progressive order change default (POD) markers in the main header 2.

1. Layer-resolution-component-position progressive,
2. Resolution-layer-component-position progressive,
3. Resolution-position-component-layer progressive,
4. Position-component-resolution-layer progressive,
5. Component-position-resolution-layer progressive.

SUMMARY OF THE INVENTION

Embodiments of the present invention comprise methods and systems that allow customized transmission of image files over a network. Embodiments of the present invention provide for scalable image resolution, quality scalability including signal-to-noise ratio (SNR) scalability, region-of-interest (ROI) selection and other features.

In some embodiments of the present invention, a user may select quality scalability thereby allowing a client application to begin rendering an image before the image is fully transmitted. This may be performed by rendering an image coarsely and reducing the coarseness of the image progressively as data is received.

Some embodiments of the present invention may allow for region-of-interest (ROI) scalability wherein a user may select a region-of-interest that may be transmitted alone or given priority in the image transmission process. A user may select a ROI to be viewed and an embodiment of the present invention may transmit only that area to the user thereby decreasing latency. Alternatively, a user may select a ROI and another embodiment of the present invention will select that ROI area for priority transmission to be followed by transmission of the remainder of the image. In this manner, a ROI may be viewed more quickly and, if desired, another portion or the remainder of the image may be viewed after inspection of the ROI.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
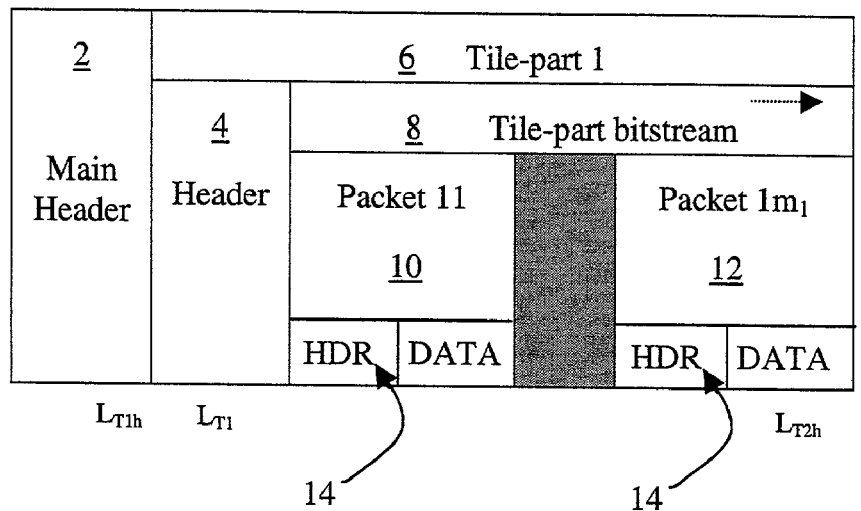
FIG. 1 is a diagram showing elements of an exemplary image file structure.

The currently preferred embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Some embodiments of the present invention are explained in reference to a specific embodiment which employs an HTTP protocol for streaming images in the JPEG2000 format. While this is used as a primary example, other protocols and image formats may be used in embodiments of the present invention.

In some embodiments, the above described features and/or other features may be implemented using a client application which downloads the target image at a reduced resolution and displays that image as a "thumbnail" for user manipulation, reference and input such as ROI selection and other selection. Once the thumbnail has been downloaded and displayed, a user may select a portion of the image for display at a resolution higher than that of the thumbnail. A user may select a ROI on the thumbnail or on a higher-resolution image using many known input device methods. Generally, a rectangular region will be delineated by a series of inputs, such as mouse clicks, and the client application will request the portion of the image corresponding to the designated region of interest. In this manner, a portion of the image may be displayed without waiting for display of the entire image.

Some embodiments of a client application may provide for selection of image resolution. Typically, for large, high-resolution images, there will be a range of resolutions between the maximum image resolution and a minimum thumbnail resolution. These embodiments will allow a user to select an optimum resolution below the maximum image resolution which will reduce latency.

A client application of embodiments of the present invention may also allow a user to select whether quality scalability is enabled. When enabled, quality scalability can render relevant image details prior to complete image transmission thereby allowing a user to make image decisions prior to complete transmission of the image. Quality scalability may be applied to the thumbnail used for ROI selection as well as the target image.

In a parent application, the inventor introduced an index file concept which allows a client to make intelligent HTTP requests to obtain required portions of an image file bitstream, such as a JPEG 2000 bitstream, from a web server. Embodiments of the present invention may utilize index file methods while other embodiments may operate without index files. Embodiments of the present invention comprise image data streaming methods and systems which employ client side parsing to customize and modify the image data. The architectures of these embodiments may be web based and may use HTTP protocols. These methods can be used without any explicit index file.

Known methods include a set of application programming interfaces (APIs) for random access of segments of JPEG2000 file and an architecture for cache management, network packetization and packet loss recovery for JPEG2000 files. There are several drawbacks of this approach. It needs a proprietary server to support the above features, whereas embodiments of the present invention may work with any standard HTTP 1.1 web server or other servers configurations. Some embodiments may be used with any HTTP 1.1 server supporting byte-ranges. Several commercial and free HTTP servers exist which are compatible with embodiments of the present invention.

HTTP runs on top of TCP/IP, which supports reliable packet delivery. Caching is also supported by HTTP. Unlike audio and video data, which have real-time properties and thus cannot be optimally transmitted using TCP/IP, the JPEG2000 images can be transmitted using this reliable delivery mechanism. Whereas error concealment and error resilience are active research areas for video and audio data, an image (i.e., JPEG2000) typically needs to be transported reliably and any packet loss is better handled by re-transmission. Accordingly, embodiments of the present invention utilize web server based streaming for JPEG 2000 images. This allows easy deployment since standard web servers can host the JPEG2000 images.

Client-Side-Parsing-Based Streaming

Embodiments of the present invention comprise methods and systems which utilize client-side-parsing-based (CSPB) streaming in which a server may host an image file, such as a JPEG2000 image file, and wherein the client may read and parse portions or parts of the image file to make decisions about further processing such as reading additional required portions. In some of these methods and systems the server does not need to keep extra information in index files for the generation of thumbnails or for displaying images at prescribed resolutions. In these embodiments, the server needs to keep only the single compressed image file for each image.

Thumbnail Generation

In some embodiments of the present invention, thumbnail images are generated and may be presented to a user as part of a user interface, user reference, prompt or other communication. In some of these embodiments, a client may connect to a web server and open a file. This action may start the process of reading a part of an image file. In the case of a JPEG 2000 file, typically small chunks of bytes (n) from the JPEG2000 file are read initially. A client application or interface may read, parse and decode a sufficient amount of bytes to be able to decode a desired low-resolution image. This may be performed in an iterative process or loop. The bytes read are not necessarily contiguous in the image. A determination of which bytes may be required for a particular image may be based on parsing and decoding of data previously read from a file. The size of a chunk is left flexible and can adapt to the network connection.

In some embodiments comprising an alternative architecture, information (i.e., how many bytes are required for each resolution) may be embedded in the JPEG2000 or other image code stream as metadata. These above-described embodiments help a client display thumbnails more easily. Pseudo code of an embodiment of the present invention for the architecture for thumbnail generation is shown below:

```
open connection to the server;
while (parsing of main headers not complete)
{
    read n bytes of data from the server;
    parse and decode the read bytes ;
}
while (bytes required for reconstructing thumbnail
resolution not complete)
{
    read n bytes;
    parse and decode the read bytes;
}
close the connection;
```

Transmission of Higher Resolution Images

Once the thumbnail data for an image has been acquired, it may be displayed to the user as an aid for user input or as some other form of reference. Using many methods, a user may request a higher resolution version of the image. A connection to a server is established and small chunks of data are read. These data chunks are then parsed until sufficient data is obtained to decode up to the selected resolution. The pseudo code to obtain any particular user specified resolution of the image from the server is described below for some embodiments:

```
If the local system has cached the already read bytes
{
    Retrieve the already read bytes from the local system cache;
    Decode the bytes till the previous achieved resolution;
    Open connection to remote server;
}
else
{
    Open connection to remote server;
    while (parsing of main headers not complete)
```

-continued

```
    {
        read n bytes of data from the server;
        parse and decode the read bytes ;
    }
}
while (desired resolution not achieved)
{
    while ( bytes required for reconstructing current
resolution not complete)
    {
        read n bytes;
        parse and decode the read bytes;
    }
    reconstruct the current resolution;
    increase the resolution count;
}
close the connection;
```

Quality scalability and region-of-interest (ROI) scalability can be achieved similarly by obtaining the required portions of an image file such as a JPEG2000 bitstream.

Streaming Selected Portions of the Codestream

Since a JPEG2000 codestream is well structured, it is possible to retrieve some portion of the codestream for a particular interest. Some typical applications are resolution scalability, quality scalability and region of interest streaming. The locations of the corresponding portions of the codestream for these applications are described below.

Resolution Scalability. If the progression order follows Order 2 or Order 3 as described in the background section above, then the data for a particular resolution will be a contiguous segment in the codestream. If the progression order follows Order 1, then the data for a particular resolution will be distributed over several separate contiguous segments (one in each quality layer) in the codestream. If the progression order follows Order 4 or 5, then the data for a particular resolution will again consists of several separate contiguous segments in the codestream, with one segment in each precinct and each component.

SNR (Quality) Scalability. It is also relatively easy to achieve SNR scalability, especially when the codestream follows the first progression order. For the other progression orders, the data for a particular quality layer is distributed over several separate contiguous segments in the codestream. Their locations can be obtained from the index file or by doing on-the-fly parsing of the bitstream.

Region of Interest (ROI) Streaming. Region of interest streaming is more computationally involved as compared to the above two cases. For an arbitrary region in the spatial domain, we need to trace how each coefficient and pixel value is reconstructed in the inverse wavelet transform, and find the corresponding region in each sub-band that contributes to the reconstruction of the ROI. The precincts and code-blocks that are needed to reconstruct the ROI can then be identified. The compressed data for these precincts and code-blocks can then be located and retrieved at the server side for streaming.

Figure 2:
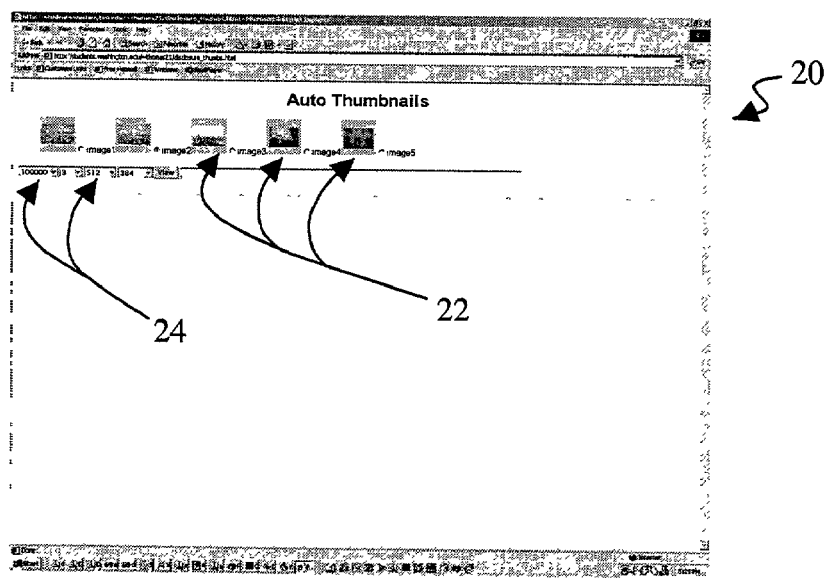
FIG. 2 is a diagram of a computer screen displaying a thumbnail interface of some embodiments of the present invention.
Figure 3:
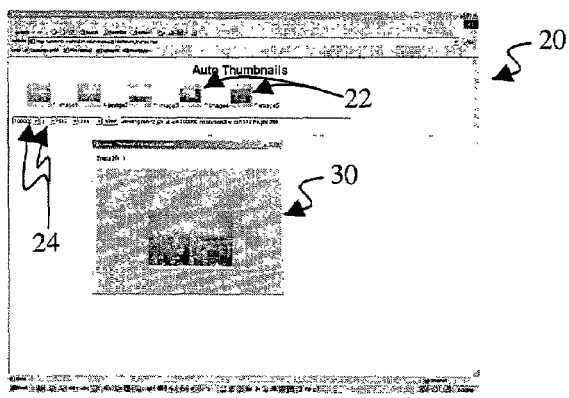
FIG. 3 is a diagram of a computer screen displaying a resolution scalability function on a thumbnail interface of some embodiments of the present invention.
Figure 4:
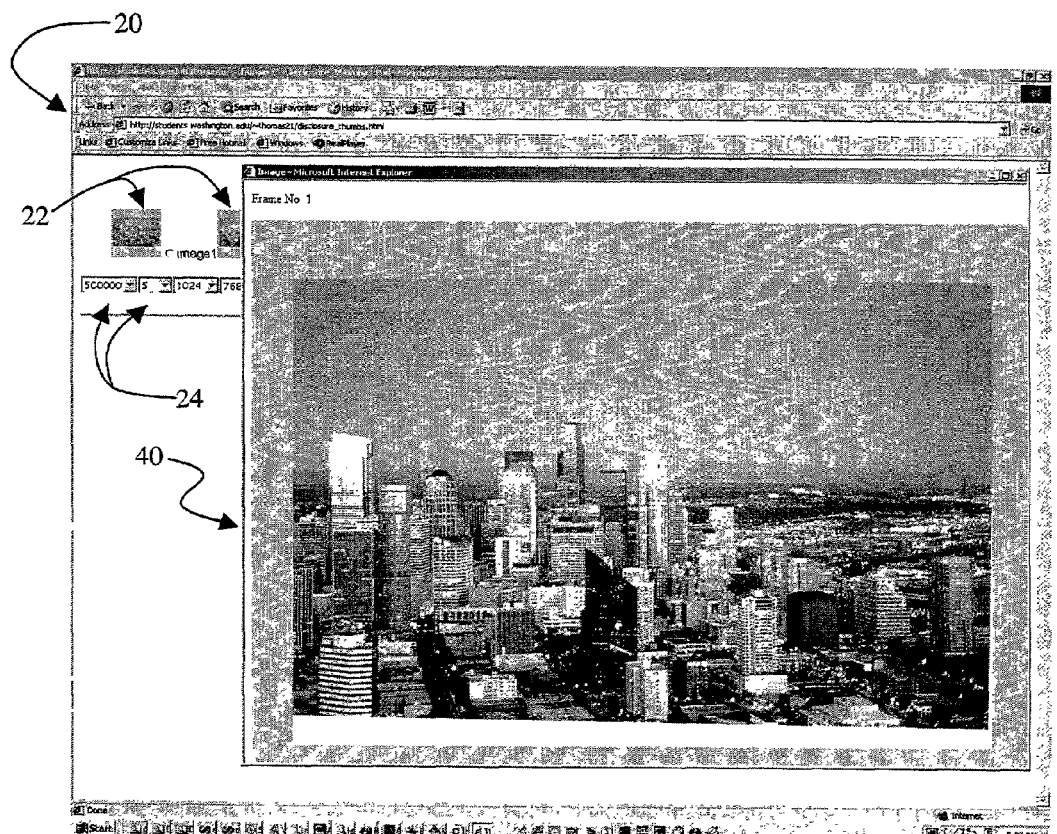
FIG. 4 is a diagram of a computer screen displaying a full resolution image on a thumbnail interface of some embodiments of the present invention.

Some embodiments of the present invention implement client-side-parsing-based streaming for JPEG 2000 images as a Java applet. An example of these embodiments is shown in FIG. 2 where the initial appearance of a web page 20 with thumbnails 22 is shown. Thumbnails 22 may be automatically generated by the client-side-parsing-based streaming as described above. Buttons, drop-down menus, dialog boxes and other user interface controls 24 may be used to obtain user data. User interface controls 24 may be used to obtain user preferences regarding image resolution, quality scalability and other data. Thumbnails 22 may be used to select a particular image or portion thereof. A region-of-interest (ROI) may be selected by clicking and dragging a particular area on one of the thumbnail images. Once user preferences are identified, the image may be streamed to the client in the preferred format. As shown in FIG. 3, an image 30 may be streamed at a prescribed resolution that is lower than the maximum resolution available for the image. This can save transmission time and resources. The user may also select to view the image at the highest available resolution 40 as shown in FIG. 4. Intermediate steps in the decoding typically utilize large amounts of resources (e.g. memory); however these are released once the decoding is over. The current web browsers also typically may put restrictions on the number of simultaneously open connections to the server. To take care of these issues, some embodiments take advantage of the fact that the different instances of the same applet class are running in the web browser. The execution of the applets is then serialized by locking and releasing the shared resources.

Some embodiments use HTTP/1.1 protocol to stream JPEG2000 images from a web server. Other embodiments may also use other similar protocols and similar image formats.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method for customized image display, said method comprising the acts of:
   receiving an initial portion of a scalable image file, defining an image, at a client device, said scalable image file being hosted on a server and wherein said initial portion comprises parts of a main header, and at least one of a tile-part header and a packet header, said initial portion also comprising initial graphical image data defining at least a portion of said image with a reduced image characteristic;
   receiving a user-selected image customization selection, related to said scalable image file, from a user interface at said client device, wherein said selection designates an more detailed image characteristic than said reduced image characteristic;
   determining at said client device, based on information in at least one of said headers in said initial portion, the bitstream location of at least one additional portion of said scalable image file that is required to render said user-selected image customization, wherein said additional portion is non-cumulative to said initial portion;
   sending a request from said client device to said server requesting data at said bitstream location;
   receiving said data at said bitstream location in response to said request; and
   rendering said user-selected image customization at said client device.

2. A method as described in claim 1 wherein said reduced image characteristic is image quality.

3. A method as described in claim 1 wherein said reduced image characteristic is image resolution.

4. A method as described in claim 1 wherein said server is an HTTP server initial portion comprises metadata comprising data selected from the group consisting of image quality data, scalability data, resolution data and ROI data.

5. A method as described in claim 1 wherein said scalable image file is a JPEG 2000 image file.

6. A method as described in claim 1 wherein said scalable image file comprises packets interleaved in a progression order selected from the group consisting of layer-resolution-component-position progressive, resolution-layer-component-position progressive, resolution-position-component-layer progressive, position-component-resolution-layer progressive and component-position-resolution-layer progressive.

7. A method as described in claim 1 wherein said request comprises an identification of said image file and at least one byte range identifying said bitstream location.

* * * * *